United States Patent Office 2,797,055
Patented June 25, 1957

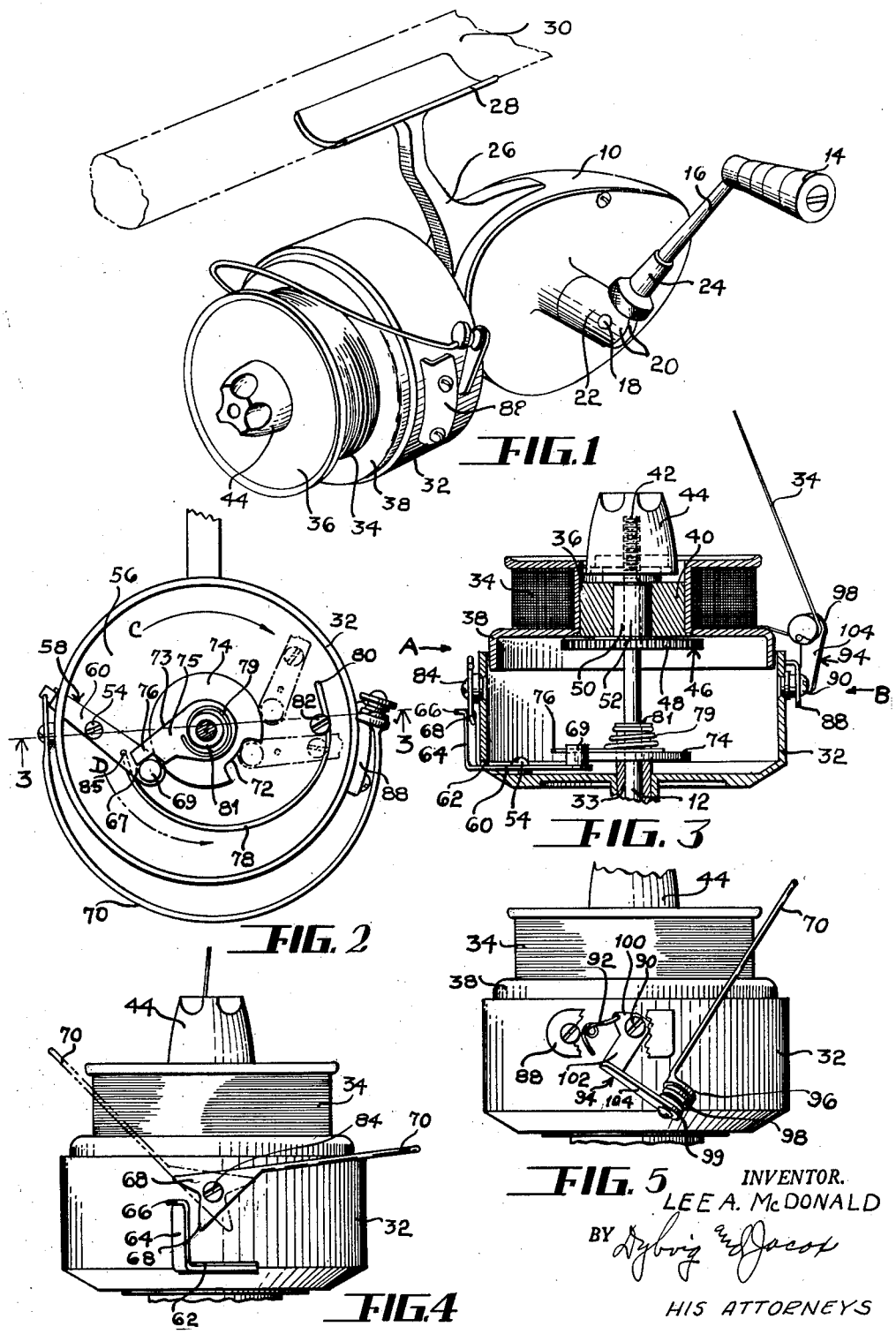

2,797,055

CASTING REEL

Lee A. McDonald, Dayton, Ohio

Application December 28, 1953, Serial No. 400,426

6 Claims. (Cl. 242—84.1)

This invention relates to reels and more particularly to devices for guiding the line in winding and keeping it free in unwinding, in casting reels of the spinning reel type, without necessarily being so limited.

It is the principal object of the invention to provide a guide for winding the line so that as it is reeled in, it is guided smoothly onto the reel and is automatically removed from the pathway of the line when the direction of the reel is reversed for unwinding.

It is a further object of the invention to provide a reel from which the line can be taken off smoothly without tension or tangling and without hindrance of guiding devices used in winding.

It is a further object of the invention to provide a pulley over which the line is guided when it is being reeled in, and means automatically operating with reversal of direction of the reel for removing the pulley from the pathway of the line as it is being reeled out.

Other objects and advantages reside in the construction of parts, the combination thereof and the mode of operation, as will become more apparent from the following description.

In the drawings,

Figure 1 is a perspective view of the reel, showing the rod by dot-dash lines.

Figure 2 is a view of the interior of the cup or reel shield, with the reel removed.

Figure 3 is a longitudinal and fragmentary, sectional view, taken substantially on the line 3—3 of Figure 2.

Figure 4 is a side elevational view taken in the direction of the arrow A in Figure 3.

Figure 5 is a side elevational view taken in the direction of the arrow B in Figure 3, with a portion of the strap broken away.

Referring in detail to the drawing, a housing 10 encases a portion (not shown) of the shaft 12. A cup and reel are mounted for rotation on the shaft 12 adjacent the housing 10, the cup being rotated in conventional manner by the handle 14. The arm portion 16 of the handle is pivoted at 18 between divided portions or furcations 20 of a rotating member 22. The threaded sleeve 24 is adapted to be tightened down against divided portions 20, or loosened therefrom to maintain or release a selected angle for the arm 16. By loosening the threaded sleeve, the handle may be folded towards the housing 10.

An arm 26 extends upwardly from the upper portion of the housing 10 and supports a pole rest 28. A pole 30 is shown in broken lines in Figure 1. In casting, the pole is gripped together with its support 30. All of the foregoing structure is old.

The reel or spool for winding the line 34 is shown at 36. The depending flange 38, associated with the reel 36, fits into the cup 32, and has rotating relationship with respect to it. The spool or reel 36 is provided with a circular apertured bushing 40, within which a circular apertured bearing 50 is rigidly fitted. The portion 52 of the shaft 12 is adapted to receive the bearing 50.

The end of the shaft is threaded, as shown at 42. The reel is held in place on the shaft 12 by means of the internally threaded cap 44. The bushing 40 is countersunk to receive the cap 44. The cap 44 cooperates with the bushing 40 to form a brake or clutch mechanism, permitting relative movement between the shaft 12 and the reel 36 when the cap loosely engages the bushing 40. By tightening the cap 44 against the bushing 40, the reel is non-rotatably mounted on the shaft. By adjusting the cap 44, the desired degree of braking action between the reel 36 and the shaft 12 may be obtained. The slippage of the reel permits the reel, which is generally stationary, to rotate when a pull in excess of a predetermined amount is put on the line. In other words, this slippage should take place before reaching the pull that breaks the line.

The shaft 12 carries a rigid disc 46 provided with peripheral teeth 48. A spring strap (not shown) is seated upon the under surface of the reel and engages the teeth 48. This spring provides a signal or a warning that the reel is turning and the clutch is slipping. When the clutch slips and the operator keeps cranking, he is then putting a twist in the line. When the clutch slips, the angler should stop cranking.

The shaft is mounted within the housing 10 in the conventional manner, not shown, to provide the backward and forward movement of the reel necessary for the smooth winding of the line upon the reel.

By rotating the handle 14, so as to drive member 22, the cup 32 is rotated through a suitable gear mechanism, not shown. When the handle 14 is rotated in one direction, the cup 32 rotates in a predetermined direction and when the handle is rotated in the opposite direction, the cup is rotated in the reverse direction. At the same time that the cup 32 rotates, the shaft 12 reciprocates along its longitudinal axis, causing the backward and forward movement of the reel, thereby causing the line to be evenly wound upon the reel or spool.

The cup 32 is mounted upon a bearing 33 to facilitate its rotation relative to the shaft 12. Pivoted at 54 upon the interior base surface 56 of the cup 32 is a rocking arm 58 of right angular formation. The portion 60 of the arm 58 lies along and is parallel to the interior base surface 56 of the cup 32 and is received through a slot 62 located circumferentially at the base of the cup 32. A right angular portion 64 of the arm 58 thus rises adjacent the exterior surface of the cup and terminates in a lug portion 66, which is adapted to engage fins or lugs 68 on a bail 70.

The portion 67 of the arm 58 lies opposite the pivot 54 with respect to the portion 60 and terminates in a lug 69. The lug 69 is adapted to engage the circumferential portion of a disc or cam 74 rigidly secured to the non-rotatable bearing 33 as clearly shown in Figure 3.

One end of a spring 78 is attached at 80 to an aperture in the interior base surface 56 of the cup 32, and the opposite end is attached at 85 to the portion 67 of the rocking arm 58. In adjusting the spring 78, the portion 60 of the rocking arm 58 is positioned radially in the cup 32 with the spring 78 relaxed. A screw head 82 is then tightened upon the spring 78 adjacent the end attached at 80 to fix the position of the spring. Thereafter, the tension of the spring 78 operates to restore the portion 60 of the arm 58 to the radial position whenever the portion 60 is deflected away from the radial position.

When the cup 32 is rotated in the direction of the arrow D in Figure 2, that is, counterclockwise, the lug 69 travels in a counterclockwise direction along the periphery of the cam 74 until it engages a circumferential notch 72, whereupon the lug 69 drops into the notch 72, the spring 78 coming to momentary equilibrium as the arm 58 pivots to a position substantially radial with respect to the cam 74. With continued counterclockwise rotation of the cup 32, the lug 69 follows the periphery of the cam 74 out of the notch 72, the arm 58 being thereby pivoted to a position substantially tangent to the cam 74 with the spring 78 being cocked slightly so as to bias the lug 69 against the cam 74. The initial and final positions of the arm 58 are each substantially tangent to the cam 74 as clearly shown in Figure 2, with the arm 58 being pivoted about the pivot 54 approximately 68° counterclockwise upon engagement with the notch 72. During the pivotal motion the lug 66 engages a fin 68 and the bail 70 is flipped about the pivot 84 into the position shown in dotted lines in Figure 4, the bail 70 then being out of engagement with the line 34.

As the cup 32 is further rotated in the counterclockwise direction, the lug 69 will repeatedly engage the notch 72 with the arm 58 repeatedly rocking through substantially 34°. This rocking action produces a noticeable oscillatory movement of the bail 70, but does not bring the bail 70 into engagement with the line 34. When the casting reel is properly operated, however, the cup 32 is rotated in the counterclockwise direction only for the purpose of actuating the bail out of engagement with the line and continued counterclockwise rotation of the cup 32 serves no useful purpose.

It can readily be seen that upon reversal of the direction of rotation of the cup 32 to a clockwise direction, the rocking arm 58 is pivoted in a clockwise direction through substantially 68° upon engagement of the notch 72 by the lug 69, returning the bail to the line engaging position, shown in solid line detail in Figures 2 and 4.

At the opposite side of the cup, and best shown in Figure 5, a rocking arm 94 is pivoted at 90 to the cup 32. An actuating spring 92 holds the bail in either operative or inoperative position. The spring and parts associated therewith are protected by a strap 88. The outer surface of the cup is thus kept comparatively smooth and free from sharp points and moving parts, and the danger of catching line and clothing in them is diminished.

Member 96 forms a journal for mounting the pulley 98 and a support for one end of the bail 70. The pulley 98 is the guide for the line as it is being reeled in. The rocking arm 94 is provided with a lug 100 on one side of the pivot 90, to which the spring 92 is attached. On the opposite side of the pivot 90, the rocking arm 94 consists of an arm member 102, integral with arm member 104, having right angular relationship to each other in the same plane and also in a vertical plane. The arm 104 is thus in a position to provide a second journal at 99 for the pulley 98.

An arm 75 is mounted for rotation upon the bearing 33 and is provided with a notched portion 76. A compression spring 79 is secured at its upper end in a channel 81 integral with the bearing 33 as clearly shown in Figure 3. The spring 79 exerts pressure upon the arm 75 to provide a certain amount of frictional engagement between the arm 75 and the disc 74. The position of the notch 76 is such that its radial distance from the shaft 12 is approximately equal to the radius of the disc 74. When the cup is traveling in the direction of the arrow C, that is, clockwise, as viewed in Figure 2, the lug 69 engages the notch 76 and carries the arm 75 with it. The notch 76 holds the lug 69 and prevents it from dropping into the notched portion 72 of the disc 74. As long as this direction of rotation is maintained, the bail remains in operative position, causing the guide pulley 98 to guide the line upon the reel or spool 36.

When the direction is reversed by reversal of the direction of rotation of the handle 14, the direction of the cup will be reversed and its travel will be in the direction indicated by the arrow D in Figure 2, that is, counterclockwise. The arm 75 travels with it; but the contact of the lug 69 is on the rearward smooth surface 73. The positions of the arm 58 are shown progressively in dotted lines in Figure 2. The lug 69 drops into the notch 72, whereupon the arm 58 is rocked about the pivot 54, and the arm 64 engages a fin 68, causing flipping of the bail, and the removal of both bail and pulley from the path of the outgoing line.

Again reversing the direction of rotation, the lug 69 drops into the notch 72 to again reverse the bail into operative position to wind the line upon the spool. After the lug 69 is forced out of the notch 72, the notch 69 engages the lug 76 on the arm 75 before reaching the notch 72 a second time, so as to permit the cup to rotate without interruption and without the lug 69 dropping into the notch 72 during each revolution.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a casting reel, a tubular bearing member, a shaft journaled in said bearing member, a reel for receiving a line mounted on said shaft, a cylindrical cup mounted on said bearing member for rotation with respect to said shaft, means for rotating said cup in either direction relative to said shaft, line guiding means pivotally mounted upon said cup for guiding said line onto said reel, and selectively operable means for actuating said line guiding means including a substantially circular cam rigidly mounted on said bearing member adjacent the interior base surface of said cup, said cam being provided with a notched portion in the circumferential edge thereof, a radially extending arm rotatably mounted on said bearing member adjacent said cam, one edge of said arm presenting a smooth surface and the opposite edge thereof presenting a notch, said notch being placed a radial distance from said bearing substantially equal to the radius of said cam, an L-shaped rocking arm having a first portion disposed parallel to the interior base surface of said cup and pivotally secured thereto at a point midway of its length and a second portion extending parallel and adjacent the side of said cup, one end of said first portion being provided with a lug for engaging said cam, the other end of said first portion extending through a circumferentially disposed slot in the wall of said cup and connecting with said second portion, said second portion having means for engaging said line guiding means, a biasing spring adapted to actuate said rocking arm so as to bias the lug thereof into compressive engagement with said cam, the notched portion of said cam cooperating with said biasing spring to pivot said rocking arm so as to move said line guiding means into and out of engagement with said line in response to the rotation of said cup relative to said cam, the operation of said rocking arm being determined by the direction of rotation of said cup relative to said cam, said radially extending arm operating to catch said lug so as to interrupt the operation of said cam when said line guiding means is in engagement with the line and said cup is being rotated so as to wind said line upon said reel.

2. In a casting reel, a tubular bearing member, a shaft journaled for reciprocating motion in said bearing member, a reel for receiving a line mounted upon said shaft, a cylindrical cup mounted upon said bearing member for rotation with respect to said shaft, means for rotating said cup in either direction with respect to said shaft, selectively operable line guiding means carried by said cup, and means for operating said line guiding means including a substantially circular disc rigidly mounted on said bearing member adjacent the interior base surface of said cup, said disc being provided with a notched portion on the circumferential edge thereof, said cup being provided with a circumferentially disposed slot in the side thereof adjacent the base thereof, an L-shaped rocking arm comprising a first portion disposed parallel to said interior base surface and pivotally mounted thereon at a point midway of its length, said first portion being provided with a lug at one end thereof adapted to engage the peripheral edge of said disc, the opposite end of said first portion projecting out of said cup through said circumferentially disposed slot, said rocking arm being further provided with a second portion extending parallel to and adjacent the exterior side of said cup, means carried by said second portion for operating said line guiding means, a biasing spring adapted to actuate said rocking arm so as to bias the lug thereof into compressive engagement with the circumferential edge of said disc, the notched portion of said disc and said biasing spring cooperating to rock said rocking arm so as to operate said line guiding means into and out of engagement with said line in response to rotation of said cup relative to said disc, the movement of said rocking arm being determined by the direction of rotation of said cup relative to said disc, and means for engaging and restraining said lug from coacting with said disc when said cup is rotated so as to guide said line upon the reel and when simultaneously said line guiding means is in engagement with said line.

3. In a casting reel, a tubular bearing member, a shaft journaled for reciprocating motion in said bearing member, a reel for receiving a line mounted upon said shaft, a cylindrical cup mounted upon said bearing member for rotation with respect to said shaft, means for rotating said cup in either direction with respect to said shaft, and selectively operable line guiding means for guiding the line upon said spool including a disc rigidly mounted on said bearing member adjacent the interior base surface of said cup, said disc being provided with a notched portion on the circumferential edge thereof, said cup being provided with a circumferentially disposed slot in the side thereof adjacent the base thereof, an L-shaped rocking arm comprising a first portion disposed parallel to said interior base surface and pivotally mounted thereon at a point midway of its length, said first portion being provided with a lug at one end thereof adapted to engage the peripheral edge of said disc, the opposite end of said portion projecting out of said cup through the circumferential slot therein, said rocking arm being provided with a second portion extending parallel to and adjacent the side of the cup, a bail provided with line guiding means pivotally mounted on the exterior surface of said cup and provided with fins disposed adjacent said second portion, means carried by said second portion for engaging said fins, a biasing spring adapted to actuate said rocking arm so as to bias the lug thereof into compressive engagement with the circumferential edge of said disc, the notched portion of said disc and the biasing spring cooperating to rock said rocking arm so as to flip said bail into and out of engagement with said line in response to rotation of said cup relative to said disc, the movement of said rocking arm being determined by the direction of rotation of said cup relative to said disc, and means for engaging and restraining said lug from coacting with said disc when said cup is rotated so as to guide the line upon said reel, and when simultaneously said line guiding means is in engagement with the line.

4. In a casting reel, a tubular bearing member, a shaft journaled for reciprocating motion in said bearing member, a reel for receiving a line mounted upon said shaft, a cylindrical cup mounted upon said bearing member for rotation with respect to said shaft, means for rotating said cup in either direction with respect to said shaft, and selectively operable line guiding means for guiding the line upon said spool including a disc rigidly mounted on said bearing member adjacent the interior base surface of said cup, said disc being provided with a notched portion on the circumferential edge thereof, said cup being provided with a circumferentially disposed slot in the side thereof adjacent the base thereof, an L-shaped rocking arm comprising a first portion disposed parallel to said interior base surface and pivotally mounted thereon at a point midway of its length, said first portion being provided with a lug at one end thereof adapted to engage the peripheral edge of said disc, the opposite end of said first portion projecting out of said cup through the circumferential slot therein, said rocking arm being provided with a second portion extending parallel to and adjacent the side of the cup, a bail provided with line guiding means pivotally mounted on the exterior surface of said cup and provided with fins disposed adjacent said second portion, means carried by said second portion for engaging said fins, a biasing spring adapted to actuate said rocking arm so as to bias the lug thereof into compressive engagement with the circumferential edge of said disc, the notched portion of said disc and biasing spring cooperating to rock said rocking arm so as to flip said bail into and out of engagement with said line in response to rotation of said cup relative to said disc, the movement of said rocking arm being determined by the direction of rotation of said cup relative to said disc, and means for engaging and restraining said lug from coacting with said disc when said cup is rotated so as to guide the line upon said reel, and when simultaneously said line guiding means is in engagement with the line, said restraining means comprising a radially disposed arm rotatably mounted upon said tubular bearing member adjacent said disc, and means urging said arm into frictional engagement with said disc, said arm being provided with a notched portion adapted to engage said lug to thereby restrain coaction between the lug and the periphery of said disc when the cup is rotated so as to guide line upon the spool.

5. A casting reel comprising in combination, a tubular bearing member, a shaft mounted in said bearing member and projecting therefrom, a spool mounted on said shaft, a cup having a base and cylindrical side walls mounted for rotation on said bearing member adjacent said spool, means for selectively rotating said cup in either direction with respect to said spool, guide means pivotally mounted on said cup for guiding a line onto said spool, rocking means pivotally mounted in said cup for positioning said guide means, a cam mounted rigidly on said tubular bearing member adjacent the inner base surface of said cup, said cam having an actuating portion, inter-engaging means between said cam and said rocking means for actuating the rocking means so as to position said guide means in response to rotation of said cup, said inter-engaging means including a lug carried by said rocking means engageable with said cam, and means including an arm having a notch rotatably mounted on said tubular bearing member for engaging said lug thereby restraining the lug from engaging the actuating portion of the cam when the guide means is positioned to guide the line and said cup is rotated so as to guide line upon the spool.

6. A casting reel comprising, in combination, a tubular bearing member, a shaft mounted in said bearing member and projecting therefrom, a spool mounted on said shaft, a cup having a base and cylindrical side walls mounted for rotation on said bearing member adjacent said spool, means for selectively rotating said cup in either direction with respect to said spool, guide means pivotally mounted on said cup for guiding a line onto said spool, an L-shaped rocking arm having a portion parallel to and pivotally attached to the inner surface of the base portion of said cup and provided with means for engaging said guide means for changing its postion, a substantially circular cam mounted on said tubular bearing member adjacent the inner base surface of said cup, inter-engaging means between said cam and said L-shaped rocking arm for rocking said L-shaped arm about its pivot in response to rotation of said cup, and means for restraining said inter-engaging means when the guide means is positioned to guide the line and said cup is rotated so as to guide line upon the spool, said inter-engaging means comprising a lug carried by said rocking arm, a notched portion in the circumference of said cam, and means biasing said lug against the periphery of said cam, said restraining means comprising a notched arm rotatably mounted upon said tubular bearing member in contact with said cam, and yielding means pressing said arm into friction contact with said cam, said lug engaging said notched arm when the cup is rotated to guide line upon the spool and being thereby restrained from engaging said cam.

References Cited in the file of this patent

UNITED STATES PATENTS

| | | |
|---|---|---|
| 1,187,840 | Illingworth | June 20, 1916 |
| 2,615,647 | Palmer et al. | Oct. 28, 1952 |
| 2,665,856 | Shakespeare et al. | Jan. 12, 1954 |
| 2,668,024 | Campbell | Feb. 2, 1954 |

FOREIGN PATENTS

| | | |
|---|---|---|
| 195,577 | Switzerland | Feb. 15, 1938 |
| 615,340 | Great Britain | Jan. 5, 1949 |
| 455,246 | Canada | Mar. 22, 1949 |